United States Patent [19]

Kishida et al.

[11] Patent Number: 4,699,948

[45] Date of Patent: Oct. 13, 1987

[54] VINYL CHLORIDE POLYMER RESIN COMPOSITION

[75] Inventors: Kazuo Kishida, Hiroshima; Kazuo Ueda, Kawasaki; Masahiro Kaneda, Ohtake, all of Japan

[73] Assignee: Mitsubishi Rayon Co., Ltd., Tokyo, Japan

[21] Appl. No.: 801,051

[22] Filed: Nov. 22, 1985

[30] Foreign Application Priority Data

Dec. 3, 1984 [JP] Japan ................................ 59-255486

[51] Int. Cl.$^4$ ...................... C08L 27/06; C08L 51/06
[52] U.S. Cl. ...................................... 525/85; 525/81; 525/902
[58] Field of Search ................... 525/85, 902

[56] References Cited

U.S. PATENT DOCUMENTS

| | | | |
|---|---|---|---|
| 3,793,402 | 2/1974 | Owens | 525/902 |
| 3,925,510 | 12/1975 | Ide et al. | 525/902 |
| 4,543,383 | 9/1985 | Heil et al. | 524/458 |

*Primary Examiner*—Carman J. Seccuro
*Attorney, Agent, or Firm*—Kenyon & Kenyon

[57] ABSTRACT

Disclosed is a vinyl chloride polymer composition comprising:
(i) 100 parts by weight of a vinyl chloride polymer containing at least 80 wt. % of vinyl chloride units, and
(ii) 0.05 to 25 wt. parts of a three-stage polymer (II), which is obtained by polymerizing 10 to 30 wt. parts of at least one monomer (B), which is selected from acrylic acid esters, methacrylic acid esters, aromatic vinyl compounds, cyano-vinyl compounds and vinyl ester compounds so that the glass transition temperature of a polymer obtained by separately polymerizing the monomer (B) is 0° to 60° C., in the presence of 45 to 85 wt. parts of a methyl methacrylate polymer (A) containing at least 80 wt. % of methyl methacrylate units; and then polymerizing 5 to 25 wt. parts of a methyl methacrylate monomer or monomer mixture (C) containing at least 80 wt. % of methyl methacrylate in the presence of the obtained copolymer comprising the components (A) and (B) so that the total amount of the components (A), (B), and (C) is 100 wt. parts. The vinyl chloride polymer composition is advantageous in that the gelation speed is high, the parting property at the calendering step is good, adhesion to the vessel wall is not caused at the blending step before the processing, the processability is excellent, and the composition gives a molded articles having a good transparency and a good surface condition.

14 Claims, No Drawings

VINYL CHLORIDE POLYMER RESIN COMPOSITION

BACKGROUND OF THE INVENTION (1) Field of the Invention

The present invention relates to a vinyl chloride polymer resin composition having incorporated therein, as a processing aid, a specific polymer prepared by a sequential three-stage polymerization process and having a good dispersibility in a vinyl chloride polymer resin.

(2) Description of the Related Art

Since a vinyl chloride polymer resin has excellent physical and chemical properties, the resin is widely used for the production of rigid articles such as films, sheets and bottles, and non-rigid articles such as floor covering materials and wire coverings. However, the vinyl chloride polymer resin has poor processability.

As means for improving the poor processability of the vinyl chloride polymer resin, Japanese Examined Patent Publications No. 52-1745 and No. 52-1746 have proposed a vinyl chloride polymer resin composition comprising a vinyl chloride polymer resin and, incorporated therein as a processing aid, a polymer obtained by a sequential two-stage polymerization process wherein a predominant amount of a copolymer component (A) comprising a predominant amount of a methyl methacrylate and a minor amount of an alkyl acrylate, and a minor amount of a polymethyl methacrylate component (B) are prepared either in the order of components (A) and (B) or in the order of components (B) and (A).

The above-proposed vinyl chloride polymer resin composition has excellent processability because the gelation of the vinyl chloride polymer resin is promoted without degradation of the good characteristics possessed by the resin, and a molded article prepared from this resin composition exhibits excellent surface condition, transparency, and secondary processability. However, this resin composition has a problem in that blocks are readily formed at the blending step before the processing, especially during the mixing in a Henschel mixer, and difficulties such as adhesion to the vessel wall occur at the blending step.

SUMMARY OF THE INVENTION

Under the above-mentioned background, it is a primary object of the present invention to provide a vinyl chloride polymer resin composition, which is characterized in that the gelation speed is high, the releasability at the calendering step is good, adhesion to the vessel wall does not occur at the blending step before the processing, for example, during the mixing in a Henschel mixer, and the processability is excellent, and which gives a molded article having a good transparency and a good surface condition.

In accordance with the present invention, there is provided a vinyl chloride polymer resin composition comprising:

(i) 100 parts by weight of a vinyl chloride homopolymer or a vinyl chloride copolymer containing at least 80% by weight of units derived from vinyl chloride, and (ii) 0.05 to 25 parts by weight of a three-stage polymer (II), which is obtained by polymerizing 10 to 30 parts by weight of at least one monomer (B), which is selected from the group consisting of acrylic acid esters, methacrylic acid esters, aromatic vinyl compounds, vinyl cyanide compounds and vinyl ester compounds so that the glass transition temperature of a polymer obtained by separately polymerizing the monomer (B) is 0° to 60° C., in the presence of 45 to 85 parts by weight of a methyl methacrylate polymer (A) containing at least 80% by weight of units derived from a methyl methacrylate; and then polymerizing 5 to 25 parts by weight of a methyl methacrylate monomer or a methyl methacrylate monomer mixture (C) containing at least 80% by weight of methyl methacrylate in the presence of the obtained copolymer comprising the components (A) and (B) so that the total amount of the components (A), (B) and (C) is 100 parts by weight.

DESCRIPTION OF THE PREFERRED EMBODIMENTS

The vinyl chloride polymer (I) used in the present invention is a homopolymer of vinyl chloride or a copolymer of vinyl chloride with up to 20% by weight of another monomer copolymerizable with vinyl chloride. These polymers may be used either alone or in the form of a mixture thereof. As another monomer copolymerizable with vinyl chloride, there can be mentioned, for example, vinyl acetate, ethylene, propylene, styrene, alkyl acrylates, and alkyl methacrylates.

The three-stage polymer (II) used in the present invention is a three-stage polymer obtained by polymerizing the components (B) and (C) in sequence in the presence of the methyl methacrylate polymer (A). The three-stage polymer (II) will now be described in detail.

The methyl methacrylate polymer (A) is polymethyl methacrylate or a copolymer of methyl methacrylate with up to 20% by weight of other monomer copolymerizable with methyl methacrylate. As another monomer copolymerizable with methyl methacrylate, there can be mentioned, for example, acrylic acid esters such as ethyl acrylate, butyl acrylate, 2-ethylhexyl acrylate, and benzyl acrylate; methacrylic acid esters, exclusive of methyl methacrylate, such as ethyl methacrylate, butyl methacrylate, 2-ethylhexyl methacrylate and benzyl methacrylate; aromatic vinyl compounds such as styrene, α-methylstyrene, and vinyltoluene; cyanogen compounds such as acrylonitrile and methacrylonitrile; and vinyl esters such as vinyl acetate. These monomers may be used either alone or in the form of a mixture thereof according to the intended use. If the copolymerization ratio of the comonomer exceeds 20% by weight, the effect of improving the processability characteristics by the component (A) is not substantially attained, and the surface gloss of the molded article is degraded.

In carrying out the present invention, the methyl methacrylate polymer is preferably polymethyl methacrylate or a copolymer of methyl methacrylate with up to 20% by weight of at least one compound selected from acrylic acid esters, methacrylic acid esters exclusive of methyl methacrylate, and aromatic vinyl compounds, as mentioned hereinbefore. Namely, a copolymer of methyl methacrylate with an acrylic acid ester, a copolymer of methyl methacrylate with a methacrylic acid ester exclusive of methyl methacrylate, and a copolymer of methyl methacrylate with an aromatic vinyl compound are preferably used.

As the constituent of the component (A), a polyfunctional monomer such as divinylbenzene or allyl methacrylate may be used. It is preferred that the amount of the polyfunctional monomer used be up to 2.0% by weight.

The amount of the component (A) in 100 parts by weight of the three-stage polymer (II) is 45 to 85 parts by weight and preferably 60 to 80 parts by weight. If the amount of the component (A) is smaller than 45 parts by weight in 100 parts by weight of the three-stage polymer (II), the dispersibility in the vinyl chloride polymer resin is degraded and the effect of improving the processability is insufficient. If the amount of the component (A) is larger than 85 parts by weight in 100 parts by weight of the three-stage polymer (II), an ungelled product is formed and the surface characteristics of the molded article are often degraded.

The component (B) is at least one monomer selected from the group consisting of acrylic acid esters, methacrylic acid esters, aromatic vinyl compounds, vinyl cyanide compounds, and vinyl ester compounds. The monomer or monomer mixture thereof should be selected so that the glass transition temperature (hereinafter referred to as "Tg") of a polymer obtained by separately polymerizing the monomer or monomer mixture thereof is 0° to 60° C. One of the characteristic features of the present invention resides in that a monomer giving a polymer having Tg of 0° to 60° C. is selected as the component (B), and by virtue of this characteristic feature, the intended effects of the present invention can be attained.

As the acrylic acid ester, there can be mentioned, for example, ethyl acrylate, butyl acrylate, 2-ethylhexyl acrylate, and benzyl acrylate. As the methacrylic acid ester, there can be mentioned, for example, methyl methacrylate, ethyl methacrylate, butyl methacrylate, 2-ethylhexyl methacrylate, and benzyl methacrylate. As the aromatic vinyl compound, there can be mentioned, for example, styrene, α-methylstyrene and vinyltoluene. As the vinyl cyanide compound, there can be mentioned, for example, acrylonitrile and methacrylonitrile, and as the vinyl ester, there can be mentioned, for example, vinyl acetate.

In carrying out the present invention, a monomer or monomer mixture comprising 50 to 100% by weight of a methacrylic acid ester as mentioned above and 0 to 50% by weight of an acrylic acid ester as mentioned above, or a monomer or monomer mixture comprising 50 to 100% by weight of an aromatic vinyl compound as mentioned above and 0 to 50% by weight of an acrylic acid ester as mentioned above, is preferably used as the component (B).

The amount of the component (B) in 100 parts by weight of the three-stage polymer (II) is 10 to 30 parts by weight and preferably 15 to 30 parts by weight. If the amount of the component (B) is smaller than 10 parts by weight, the effect of promoting the gelation at the time of processing the vinyl chloride polymer resin is low, the releasability at the calendering step is poor, and a good processability cannot be sufficiently attained. Furthermore, at the post treatment after the polymerization, such as coagulation, dehydration or drying, the recovery of the polymer is difficult and fine powder is formed in a large quantity, and thus good results cannot be obtained in regard to the productivity. If the amount of the component (B) is larger than 30 parts by weight, when a film is formed from the obtained polymer resin composition, the gloss of the film is poor and other properties are insufficient. Furthermore, at the post treatment after the polymerization, such as coagulation, dehydration or drying, secondary aggregation is readily caused and thus a problem arises in connection with the productivity.

The component (C) is a monomer or monomer mixture having a methyl methacrylate content of at least 80% by weight. Other monomer copolymerizable with methyl methacrylate may be used as the comonomer in an amount of up to 20% by weight. As the copolymerizable monomer, there can be mentioned, for example, acrylic acid esters, methacrylic acid esters, aromatic vinyl compounds, vinyl cyanide compounds, and vinyl esters exemplified hereinbefore as the monomer copolymerizable with methyl methacrylate with reference to the component (A).

In carrying out the present invention, methyl methacrylate alone or a monomer mixture of methyl methacrylate with up to 20% by weight of at least one compound selected from acrylic acid esters, methacrylic acid esters exclusive of methyl methacrylate, and aromatic vinyl compounds is preferably used as the component (C). More specifically, a monomer mixture of methyl methacrylate with an acrylic acid ester, a monomer mixture of methyl methacrylate with a methacrylic acid ester other than methyl methacrylate, and a monomer mixture of methyl methacrylate with an aromatic vinyl compound are preferably used as the component (C).

The amount of the component (C) in 100 parts by weight of the three-stage polymer (II) is 5 to 25 parts by weight and preferably 5 to 20 parts by weight. If the amount of the component (C) is smaller than 5 parts by weight, the dispersibility of the obtained three-stage polymer (II) in the vinyl chloride polymer resin is poor, and blocks are formed at the step of blending the three-stage polymer (II) with the vinyl chloride polymer resin, often leading to an increase in the torque. If the amount of the component (C) exceeds 25 parts by weight, the effect of promoting the gelation is insufficient, an ungelled product is formed, and the surface characteristics of the molded article are degraded.

The three-stage polymer (II) of the present invention can be easily obtained by polymerizing the components (B) and (C) in sequence in the presence of the methyl methacrylate polymer (A). As the polymerization process, there may be appropriately adopted an emulsion polymerization process, a suspension polymerization process, and a bulk polymerization process. Of these processes, an emulsion polymerization process is preferred.

In the preparation of the three-stage polymer (II), when a three-staged structure is formed by an emulsion polymerization process, it is preferred that the second stage and subsequent polymerizations be conducted without further addition of an emulsifier so as to substantially control formation of a homopolymer of the component (B) or a homopolymer of the component (C).

A known emulsifier may be used. For example, there may be used anionic surface active agents such as fatty acid salts, alkyl sulfate salts, alkyl benzene-sulfonate salts, alkyl phosphate salts, and dialkyl sulfosuccinate salts; non-ionic surface active agents such as polyoxyethylene alkyl ethers, polyoxyethylene fatty acid esters, sorbitol fatty acid esters, and glycerol fatty acid esters; and cationic surface active agents such as alkylamine salts. These surface active agents may be used either alone or in the form of a mixture thereof.

Water-soluble or oil-soluble polymerization initiators of the single system or the oxidation-reduction system may be used. For example, an inorganic initiator such as an ordinary persulfate or an organic initiator such as an organic peroxide or an azo compound may be used either alone or in combination with a sulfite, hydrogen sulfite, a thiosulfate, a primary metal salt or sodium formaldehyde sulfoxylate as a redox type initiator. As the persulfate preferably used as the initiator, there can be mentioned sodium persulfate, potassium persulfate, and ammonium persulfate, and as the organic peroxide, there can be mentioned t-butyl hydroperoxide, cumene hydroperoxide, benzoyl peroxide, and lauroyl peroxide.

Even though the reduced viscosity of the three-stage polymer (II) is not limited, the intended effects of the present invention can be attained, but the reduced viscosity can be optionally adjusted by using a chain transfer agent or adjusting the polymerization temperature.

For example, when the three-stage polymer (II) of the present invention is prepared according to an emulsion polymerization process, the emulsion latex obtained at the termination of the emulsion polymerization is cooled and then coagulated and solidified by addition of an electrolyte such as aluminum chloride, and the polymer is recovered through filtration, washing, and drying.

The vinyl chloride polymer resin composition of the present invention is obtained by incorporating the three-stage polymer (II) having the above-mentioned structure in an amount of 0.05 to 25 parts by weight, preferably 0.05 to 15 parts by weight, into 100 parts by weight of the vinyl chloride polymer (I). If the amount incorporated of the polymer (II) is outside the above-mentioned range, the effect of improving the processability is insufficient, and when the resulting composition is formed into a film, the gloss is insufficient and the quality of the film is poor.

The vinyl chloride polymer resin composition of the present invention can be obtained by mixing together predetermined amounts of the vinyl chloride polymer (I) and the three-stage polymer (II), for example, by using a Henschel mixer or a ribbon blender, and kneading the mixture by using an extruder or a mixing roll.

A stabilizer such as an organic tin compound, a lead type, barium type or zinc type metallic soap or an epoxy compound, a lubricant such as a stearate wax, paraffin wax or stearyl alcohol, a plasticizer such as a phthalic ester, a phosphoric ester, a fatty acid ester or an epoxy compound, an impact resistance-improving agent such as an ABS resin or an MBS resin, a colorant such as carbon black or titanium oxide, a filler such as calcium carbonate or asbestos, an inorganic blowing agent such as ammonium carbonate or sodium bicarbonate, and an organic blowing agent such as a nitro type blowing agent, a sulfohydrazide type blowing agent or an azo type blowing agent may be incorporated into the vinyl chloride polymer resin composition of the present invention, if necessary.

The present invention will now be described in detail with reference to the following examples. All of "parts" in the examples and comparative examples are by weight. The physical properties were evaluated according to the following methods.

Adhesion to Vessel Wall

The composition used at the non-rigid dispersibility test was charged in a Henschel mixer, and the temperature was elevated and the adhesion to the vessel wall was evaluated according to the following rating scale.
A: no adhesion
B: no substantial adhesion
C: slight adhesion
D: considerable adhesion

Non-rigid Dispersibility

By using 6-inch rolls, 100 g of the sample was kneaded at a kneading temperature of 160° C. and a roll clearance of 1 mm for 5 minutes, and the kneaded sample was pressed at 170° C. for 5 minutes to obtain a sheet sample having a thickness of 2 mm. By using this sheet sample, the non-rigid dispersibility was evaluated according to the following rating scale.
A: good
B: fairly good
C: not good
D: poor

Adhesion to Test Rolls

By using 6-inch rolls, 100 g of the sample was kneaded at a kneading temperature of 190° C. and a roll clearance of 1 mm for 5 minutes, and the releasability was evaluated according to the following rating scale.
A: no adhesion
B: no substantial adhesion
C: slight adhesion
D: considerable adhesion

Gloss

The gloss of the surface of the sample having a thickness of 2 mm, which was subjected to the soft dispersibility test, was evaluated by gross investigation according to the following rating scale.
A: good
B: fairly good
C: not good
D: poor

Transparency

With respect to the sample having a thickness of 2 mm, which was subjected to the non-rigid dispersibility test, the total light transmittance and haze value were measured by using an integration ball haze meter according to the method of JIS K-6715.

Gelation Property

The maximum torque Mmax (Kg-m) and the time Tmax (minutes) required for obtaining Mmax were measured at a temperature of 170° C. and a rotation number of 30 rpm for a preheating time of 5 minutes with a filled sample amount of 50 g by using a Brabender Plasti-Corder. The smaller the value of Tmax, the higher the gelation speed.

EXAMPLES 1 THROUGH 8 AND COMPARATIVE EXAMPLES 1 THROUGH 7

A reaction vessel equipped with a stirrer and a reflux cooler was charged with 280 parts of water, 1.5 parts of sodium dioctyl sulfosuccinate, 0.2 parts of ammonium persulfate, and a monomer or monomer mixture as the component (A) shown in Table 1, and the atmosphere in the reaction vessel was replaced by nitrogen. The temperature in the reaction vessel was elevated to 65° C. while stirring, and heating was conducted for 2 hours with stirring. Then, a monomer or monomer mixture as the component (B) shown in Table 1 was added over a period of 1 hour, and after completion of the addition, the reaction mixture was continuously stirred for 2 hours. A monomer or monomer mixture as the component (C) shown in Table 1 was then added over a period of 1 hour, and the reaction mixture was continuously stirred for 2 hours to complete the polymerization.

The obtained emulsion was cooled and salted out by aluminum chloride, followed by filtration, washing, and drying, to obtain a sample.

The results of the measurement of the processability characteristics of the above-mentioned vinyl chloride polymer resin composition are shown in Table 1.

TABLE 1

| | Component (A) | | Component (B) | | Component (C) | | Tg (°C.) of polymer of component (B) when polymerized separately |
|---|---|---|---|---|---|---|---|
| | Monomer | Amount (parts) | Monomer | Amount (parts) | Monomer | Amount (parts) | |
| Example 1 | MMA | 70 | MMA | 10 | MMA | 10 | 12 |
| | | | BA | 10 | | | |
| Example 2 | MMA | 65 | MMA | 10 | MMA | 10 | 12 |
| | St | 5 | BA | 10 | | | |
| Example 3 | MMA | 70 | MMA | 12 | MMA | 8 | 19 |
| | | | 2EHA | 8 | St | 2 | |
| Example 4 | MMA | 65 | St | 12 | MMA | 15 | 25 |
| | | | BA | 8 | | | |
| Example 5 | MMA | 65 | BZMA | 15 | MMA | 10 | 56 |
| | BA | 10 | | | | | |
| Example 6 | MMA | 60 | EMA | 12 | MMA | 10 | 10 |
| | BA | 10 | BA | 8 | | | |
| Example 7 | MMA | 65 | MMA | 15 | MMA | 10 | 52 |
| | BA | 5 | BA | 5 | | | |
| Example 8 | MMA | 65 | 2EHMA | 10 | MMA | 8 | 51 |
| | BA | 5 | MMA | 10 | BA | 2 | |
| Comparative Example 1 | MMA | 82 | MMA | 4 | MMA | 5 | 12 |
| | St | 5 | BA | 4 | | | |
| Comparative Example 2 | MMA | 40 | St | 15 | MMA | 25 | 3 |
| | | | 2EHA | 15 | St | 5 | |
| Comparative Example 3 | MMA | 50 | MMA | 20 | MMA | 10 | 12 |
| | | | BA | 20 | | | |
| Comparative Example 4 | MMA | 50 | MMA | 10.5 | MMA | 25 | 37 |
| | BA | 5 | 2EHA | 4.5 | EMA | 5 | |
| Comparative Example 5 | MMA | 50 | BA | 40 | MMA | 10 | −45 |
| Comparative Example 6 | MMA | 65 | MMA | 18 | MMA | 10 | 81 |
| | BA | 5 | BA | 2 | | | |
| Comparative Example 7 | MMA | 71 | MMA | 6 | MMA | 4 | −16 |
| | BA | 5 | BA | 14 | | | |

| | Processability characteristics | | | | | | | |
|---|---|---|---|---|---|---|---|---|
| | | | | | Transparency | | Gelling property | |
| | Adhesion to vessel wall | Non-rigid dispersibility | Adhesion to test rolls | Gloss | Total light transmittance (%) | Haze (%) | Tmax (kg-m) | Mmax (minutes) |
| Example 1 | A | A | A | A | 85 | 6 | 1.3 | 5.2 |
| Example 2 | A | A | A | A | 86 | 5 | 1.5 | 4.9 |
| Example 3 | A | A | A | A | 86 | 6 | 1.5 | 4.8 |
| Example 4 | A | A | A | A | 85 | 7 | 1.5 | 4.9 |
| Example 5 | A | A | A | A | 85 | 6 | 1.8 | 4.6 |
| Example 6 | A | A | A | A | 83 | 10 | 1.5 | 4.8 |
| Example 7 | A | A | A | A | 85 | 7 | 1.8 | 4.6 |
| Example 8 | A | A | A | A | 83 | 11 | 2.0 | 4.6 |
| Comparative Example 1 | C | D | D | B | 85 | 6 | 3.0 | 4.2 |
| Comparative Example 2 | A | D | C | B | 82 | 11 | 2.0 | 4.6 |
| Comparative Example 3 | B | B | C | C | 80 | 16 | 1.8 | 4.6 |
| Comparative Example 4 | A | D | C | D | 80 | 12 | 2.0 | 4.6 |
| Comparative Example 5 | D | B | D | D | 75 | 30 | 5.0 | 4.1 |
| Comparative Example 6 | A | D | B | A | 85 | 7 | 1.8 | 4.6 |
| Comparative Example 7 | C | A | C | C | 81 | 12 | 2.0 | 4.7 |

In a Henschel mixer, 3 parts of the thus-obtained sample was mixed with 100 parts of polyvinyl chloride (having an average degree of polymerization of 715), 2 parts of dibutyl-tin maleate, 1.5 parts of an epoxy type stabilizer, and 0.5 part of a lubricant, and blending was completed at an inner temperature of 120° C. The adhesion to the test rolls, the gloss, the transparency, and the gelling property were determined.

Then, 40 parts of dioctyl phthalate was added to the obtained composition, and the adhesion to the vessel wall and the non-rigid dispersibility were determined.

The abbreviations used in Table 1 indicate the following monomers. The Tg values of homopolymers of the respective monomers are also shown below.

| Abbreviation | Monomer | Tg (°C.) |
|---|---|---|
| MMA | Methyl methacrylate | 105 |
| EMA | Ethyl methacrylate | 65 |
| St | Styrene | 100 |
| BA | Butyl acrylate | −45 |
| 2EHA | 2-Ethylhexyl acrylate | −55 |
| 2EHMA | 2-Ethylhexyl methacrylate | −10 |

| Abbreviation | Monomer | Tg (°C.) |
|---|---|---|
| BZMA | Benzyl methacrylate | 56 |

From the results shown in Table 1, it will be readily understood that compositions included within the scope of the present invention have excellent physical properties.

Since the vinyl chloride polymer resin composition of the present invention comprises the above-mentioned three-stage polymer comprising the components (A), (B), and (C), it exhibits an increasing gelation speed and an excellent secondary processability. Furthermore, when this three-stage polymer is blended into a vinyl chloride polymer resin, blocks are not formed at all, adhesion to the vessel wall of a mixer such as a Henschel mixer is not caused, the dispersibility in the non-rigid composition is improved, and the problem of the presence of an ungelled product can be solved. Furthermore, the transparency of the shaped article is not degraded at all by incorporation of the three-stage polymer.

We claim:

1. A vinyl chloride polymer resin composition comprising:
   (i) 100 parts by weight of a vinyl chloride homopolymer or a vinyl chloride copolymer containing at least 80% by weight of units derived from vinyl chloride, and
   (ii) 0.05 to 25 parts by weight of a three-stage polymer (II), which is obtained by polymerizing 10 to 30 parts by weight of at least one monomer (B), which is selected from the group consisting of acrylic acid esters, methacrylic acid esters, aromatic vinyl compounds, vinyl cyanide compounds and vinyl ester compounds so that the glass transition temperature of a polymer obtained by separately polymerizing the monomer (B) is 0° to 60° C., in the presence of 45 to 85 parts by weight of a methyl methacrylate polymer (A) containing at least 80% by weight of units derived from a methyl methacrylate; and then polymerizing 5 to 25 parts by weight of a methyl methacrylate monomer or a methyl methacrylate monomer mixture (C) containing at least 80% by weight of methyl methacrylate in the presence of the obtained copolymer comprising the components (A) and (B) so that the total amount of the components (A), (B) and (C) is 100 parts by weight.

2. A vinyl chloride polymer resin composition as set forth in claim 1, wherein the methyl methacrylate polymer (A) is polymethyl methacrylate.

3. A vinyl chloride polymer resin composition as set forth in claim 1, wherein the methyl methacrylate polymer (A) is a copolymer of methyl methacrylate with at least one monomer selected from the group consisting of acrylic acid esters, methacrylic acid esters exclusive of methyl methacrylate and aromatic vinyl compounds.

4. A vinyl chloride polymer resin composition as set forth in claim 1, wherein the methyl methacrylate polymer (A) is a copolymer of methyl methacrylate with an acrylic acid ester.

5. A vinyl chloride polymer resin composition as set forth in claim 1, wherein the methyl methacrylate polymer (A) is a copolymer of methyl methacrylate with a methacrylic acid ester exclusive of methyl methacrylate.

6. A vinyl chloride polymer resin composition as set forth in claim 1, wherein the methyl methacrylate polymer (A) is a copolymer of methyl methacrylate with an aromatic vinyl compound.

7. A vinyl chloride polymer resin composition as set forth in claim 1, wherein the methyl methacrylate polymer (A) is prepared by using a polyfunctional monomer.

8. A vinyl chloride polymer resin composition as set forth in claim 1, wherein the monomer (B) is a monomer or monomer mixture comprising 50 to 100% by weight of a methacrylic acid ester and 0 to 50% by weight of an acrylic acid ester.

9. A vinyl chloride polymer resin composition as set forth in claim 1, wherein the monomer (B) is a monomer or monomer mixture comprising 50 to 100% by weight of an aromatic vinyl compound and 0 to 50% by weight of an acrylic acid ester.

10. A vinyl chloride polymer resin composition as set forth in claim 1, wherein the component (C) is methyl methacrylate.

11. A vinyl chloride polymer resin composition as set forth in claim 1, wherein the component (C) is a mixture of a methyl methacrylate with at least one monomer selected from the group consisting of acrylic acid esters, methacrylic acid esters exclusive of methyl methacrylate, and aromatic vinyl compounds.

12. A vinyl chloride polymer resin composition as set forth in claim 1, wherein the component (C) is a mixture of methyl methacrylate with an acrylic acid ester.

13. A vinyl chloride polymer resin composition as set forth in claim 1, wherein the component (C) is a mixture of methyl methacrylate with a methacrylic acid ester exclusive of methyl methacrylate.

14. A vinyl chloride polymer resin composition as set forth in claim 1, wherein the component (C) is a mixture of methyl methacrylate with an aromatic vinyl compound.

* * * * *